(12) United States Patent
Wakayama (10) Patent No.: US 11,568,226 B2
(45) Date of Patent: Jan. 31, 2023

(54) SYSTEM AND METHOD FOR MACHINE-LEARNING

(71) Applicant: RENESAS ELECTRONICS CORPORATION, Tokyo (JP)

(72) Inventor: Yasushi Wakayama, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 448 days.

(21) Appl. No.: 16/709,670

(22) Filed: Dec. 10, 2019

(65) Prior Publication Data

US 2020/0210820 A1 Jul. 2, 2020

(30) Foreign Application Priority Data

Dec. 27, 2018 (JP) .............................. JP2018-243998

(51) Int. Cl.
*G06N 3/063* (2006.01)
*G06N 3/08* (2006.01)
*G06N 5/04* (2006.01)

(52) U.S. Cl.
CPC ............... *G06N 3/063* (2013.01); *G06N 3/08* (2013.01); *G06N 5/04* (2013.01)

(58) Field of Classification Search
CPC ............ G06N 3/063; G06N 3/08; G06N 3/06; G06N 5/04
See application file for complete search history.

(56) References Cited

U.S. PATENT DOCUMENTS 5,577,166 A 11/1996 Mizuno
5,899,985 A * 5/1999 Tanaka .................. G06N 5/046
706/45
2018/0240010 A1* 8/2018 Faivishevsky ....... G06N 3/0454
2019/0205742 A1* 7/2019 Takeda .................. G06N 3/049
2020/0104715 A1* 4/2020 Denolf .................. G06N 3/006

FOREIGN PATENT DOCUMENTS

| JP | 04-51354 A | 2/1992 |
| JP | 05-35707 A | 2/1993 |
| JP | 06-266398 A | 9/1994 |
| JP | 07-21378 A | 1/1995 |

OTHER PUBLICATIONS

Japanese Notice of Reasons for Refusal issued in corresponding Japanese Patent Application No. 2018-243998, dated May 31, 2022, with English translation.

* cited by examiner

*Primary Examiner* — Kamran Afshar
*Assistant Examiner* — Brian J Hales
(74) *Attorney, Agent, or Firm* — McDermott Will & Emery LLP (57) ABSTRACT

A processing system includes a receiving circuit 1 for receiving an input signal from an externally connected sensor, an expected signal generating circuit 4 for automatically generating a teaching signal for use in the learning circuit 5, a learning circuit 5 for calculating a weight value, a bias value, and the like of the neural network model to form an expected signal from the teaching signal generated by the expected signal generating circuit 4 and the signal from the receiving circuit 1, an inference circuit 2 for performing signal processing based on a learned model of the neural network model generated by the learning circuit 5, and a validity verification circuit 3' for performing similarity calculation between an output signal of the inference circuit 2 and an expected signal for comparison.

2 Claims, 13 Drawing Sheets

SYSTEM AND METHOD FOR MACHINE-LEARNING

CROSS-REFERENCE TO RELATED APPLICATIONS

The disclosure of Japanese Patent Application No. 2018-243998 filed on Dec. 27, 2018 including the specification, drawings and abstract is incorporated herein by reference in its entirety.

BACKGROUND

The present disclosure relates to system and method for machine-learning.

Some methods to generate teaching signals automatically for machine-learning are disclosed.

For example, Japanese Unexamined Patent Application Publication JP6-266398 discloses a neural network model learning device having a unit to generate teaching signals.

Further, Japanese Unexamined Patent Application Publication JP7-21378 discloses an image identification device having an automatic generating device to generate teaching signals.

SUMMARY

However, since the teaching signal generation unit disclosed in JP6-266398 generates the number of the corresponding category of the learning pattern sent to the neural network model calculation unit as the teaching signal, the category is a recognition target vocabulary, only a predetermined teaching signal is generated.

In addition, the image identification device disclosed in JP7-21378 does not disclose a method for dealing with a case where signals are input, which cannot be processed correctly by a hierarchical neural network model operation device.

It is one of the objects of the present invention to more easily obtain a desired result in signal processing using a neural network model.

Other objects and novel features will become apparent from the description of the specification and drawings.

A processing system according to one embodiment includes a receiving circuit for receiving an input signal from a sensor connected externally, an expected signal generating circuit for automatically generating a teaching signal for use in the learning circuit, a learning circuit for calculating a weight value, a bias value, and the like of the neural network model to form the expected signal from the teaching signal generated by the expected signal generating circuit and the signal from the receiving circuit, an inference circuit for performing signal processing based on a learned model of the neural network model generated by the learning circuit, and a validity verification circuit for performing a similarity calculation of an output signal of the inference circuit and an expected signal for comparison.

In the processing system according to another embodiment, desired signal processing can be performed without manually setting a complicated algorithm.

DETAILED DESCRIPTION

Hereinafter, a semiconductor device according to an embodiment will be described in detail by referring to the drawings.

In this specification and the drawings, the same or corresponding form elements are denoted by the same reference numerals, and a repetitive description thereof is omitted.

In the drawings, for convenience of description, the configuration may be omitted or simplified.

Also, at least some part of the embodiments can be combined with each other.

Figure 1:
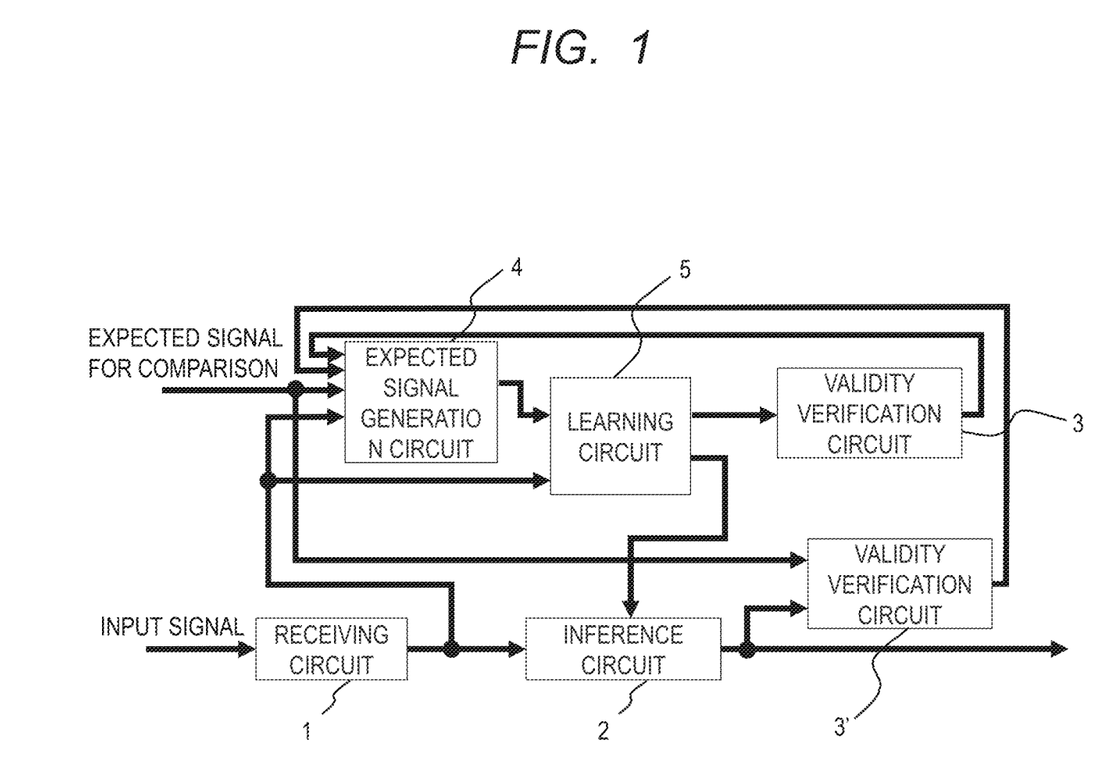
FIG. 1 is a circuit block diagram showing a processing system according to an embodiment.

FIG. 1 is a circuit diagram illustrating a processing system according to one embodiment.

The processing system comprises a receiving circuit 1, an inference circuit 2, validity verification circuits 3 and 3', an expected signal generating circuit 4, and a learning circuit 5.

Each circuit may be formed together on one integrated circuit or may be formed on plural integrated circuits separately. Some of the circuits can be connected to each other via a network.

The receiving circuit 1 is a circuit that receives an input signal from, for example, an externally connected sensor, and outputs the signal to the inference circuit 2, the expected signal generation circuit 4, the learning circuit 5, and the like.

The receiving circuit 1 may include an A/D conversion circuit or may include a circuit that cuts off only a part of the input signal based on time or intensity of the input signal.

The inference circuit 2 is a circuit that performs signal processing on the signal from the receiving circuit 1 based on the learned model of the neural network model created by the learning circuit 5.

As a technique for transferring the learned models to the inference circuit 2, there is a technique described in "Operation device Using neural network models" (JP6-266398).

The validity verification circuit 3' has a function of calculating the similarity between the output signal of the inference circuit 2 and an expected signal for comparison separately input, and determining whether or not the signal processing by the inference circuit 2 is correctly performed from a result of the calculation.

The expected signal for comparison is, for example, an output signal of the inference circuit 2 expected by the user.

The similarity is calculated by, for example, the cumulative value of the square mean of the difference between the output signal of the inference circuit 2 and the expected signal for comparison.

Naturally, if the two signals are similar, the calculated value will be a small value, and if the two signals are different, the calculated value will be a large value.

That is, when the calculated value is large, the similarity is low, and when the calculated value is small, the similarity is high.

Determining whether the signal processing by the inference circuit 2 has been performed correctly can be performed using a certain threshold for this calculated value.

When it is judged that the calculation is not correctly executed, the output signal from the receiving circuit 1 that caused the judgment is output to the expected signal generation circuit 4, and the learning circuit 5 can perform a learning of the neural network model again.

Note that the calculation of the similarity may not be a comparison with the comparison expectation signal itself but may be a comparison with a processed signal of the comparison expectation signal.

The validity verification circuit 3 has a function of calculating the similarity between the expected signal for comparison separately input (the input path is omitted from the drawing for simplifying) and the output of the learning circuit 5, and determining whether or not the learning by the learning circuit 5 is correctly performed from the calculated value.

As to the determination method, for example, the method described above for the validity verification circuit 3' can be used.

When it is determined that the neural network model is not correctly learned, the validity verification circuit 3' outputs a notification signal to the expected signal generation circuit 4, so that the learning circuit 5 can perform the learning of the neural network model again.

The expected signal generation circuit 4 has a function of automatically generating a teaching signal for use in the learning circuit 5 described later.

Generally, in order to generate a learned model such as deep learning, it is necessary to prepare an expected value of an output signal with respect to an input signal as a teaching signal.

However, it is laborious to manually generate thousands of teaching signals necessary for generating a learned model.

Therefore, the expected signal generation circuit 4 requires input of the expected signal for comparison only first once or several times but has a function of automatically generating the teaching signal thereafter.

For example, software for executing an algorithm for performing pattern recognition automatically generates a teaching signal by cutting out only a signal close to the expected signal for comparison from the output signal of the receiving circuit 1 based on the expected signal for comparison.

In addition, by using software having a plurality of algorithms for automatically generating a teaching signal as a part of the expected signal generation circuit 4, it is also possible to input a signal based on the input signal to the expected signal generation circuit 4 and to generate a teaching signal by another algorithm when the input signal from the learning circuit 5 is determined to be defective by the validity verification circuit 3.

The learning circuit 5 uses the teaching signal generated by the expected signal generating circuit 4 to calculate a weight value, a bias value, and the like of the neural network model so as to realize a neural network model that generates an expected signal with respect to a signal input from the receiving circuit 1.

Therefore, learning is performed so that the difference between the output of the learning circuit 5 and the expected signal becomes small.

The learning circuit 5 can be realized by a server or a cloud computing platform.

Next, an exemplary operation of the processing system according to this embodiment will be described.

The input signal from the outside is subjected to signal processing by the receiving circuit 1, and then, as described above, is transmitted to the inference circuit 2, the learning circuit 5, and the like.

The expected signal generating circuit 4 executes an algorithm based on a separately prepared expected signal for comparison, generates a teaching signal from an input signal from the receiving circuit 1, and transmits the teaching signal to the learning circuit 5.

The learning circuit 5 processes the signal from the receiving circuit 1 based on the teaching signal and transmits the processed signal to the validity verification circuit 3.

The validity verification circuit 3 compares the input signal from the learning circuit 5 with the expected signal for comparison, and when it is determined that the similarity is low, for example, the validity verification circuit 3 notifies the expected signal generation circuit 4.

The expected signal generation circuit 4 which has received the notification switches to another algorithm, for example, and generates a teaching signal.

The learned model generated by the learning circuit 5 by the above-described method is sent to the inference circuit 2.

The inference circuit 2 infers the signal from the receiving circuit 1 based on the learned model, and then transmits the inference signal to the validity verification circuit 3' or the like.

The validity verification circuit 3' compares the signal with the comparison expected signal, and when it is determined that the signal is defective, sends a notification signal to the expected signal generation circuit 4.

The expected signal generation circuit 4 which has received the notification switches to another algorithm, for example, and generates a teaching signal.

As a result, learning of the neural network model can be performed again by the learning circuit 5.

In the processing system according to this embodiment, it is assumed that a device in which an expected signal generating circuit 4 and a learning circuit 5 which greatly affect the generation of a teaching signal are combined and a device in which a receiving circuit 1 and an inference circuit 2 are combined are physically separately installed.

To this end, validity verification circuits 3 and 3' were installed for each device.

Figure 2:
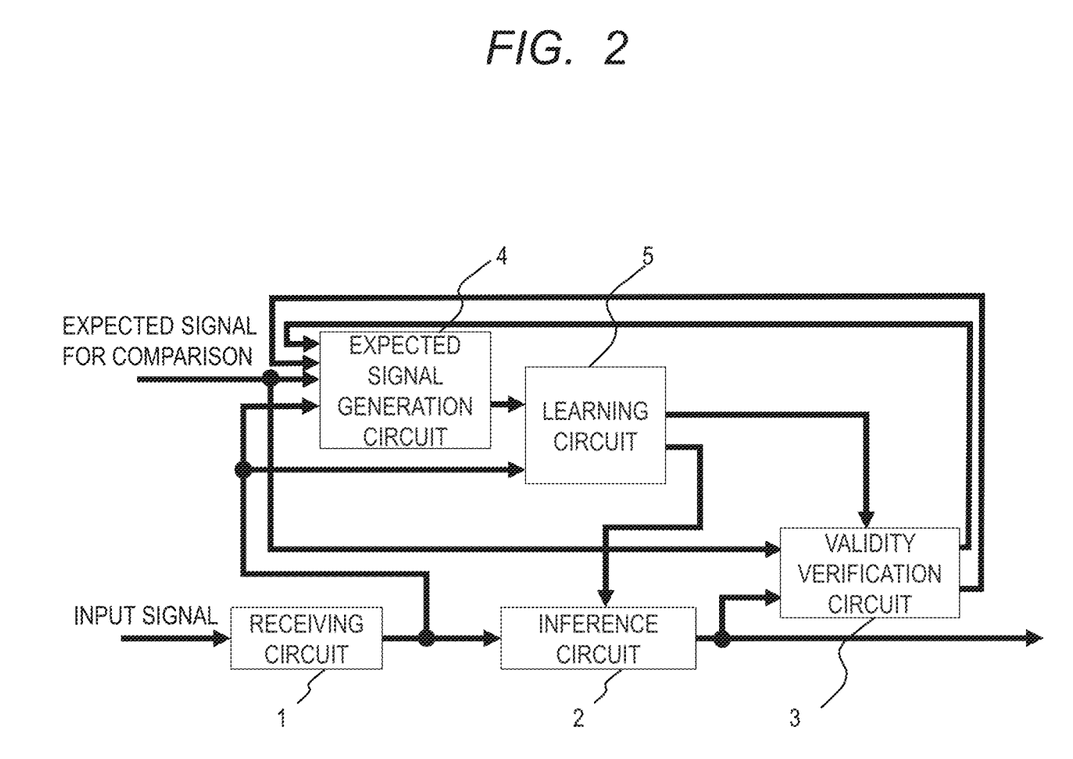
FIG. 2 is a schematic diagram illustrating a modified example of the processing system according to another embodiment of the present invention.

However, as shown in FIG. 2, only one validity verification circuit 3 may be used.

In this case, the configuration of the system can be simplified.

The same effect can also be obtained by configuring the inference circuit 2 and the learning circuit 5 with a single circuit.

Figure 3:
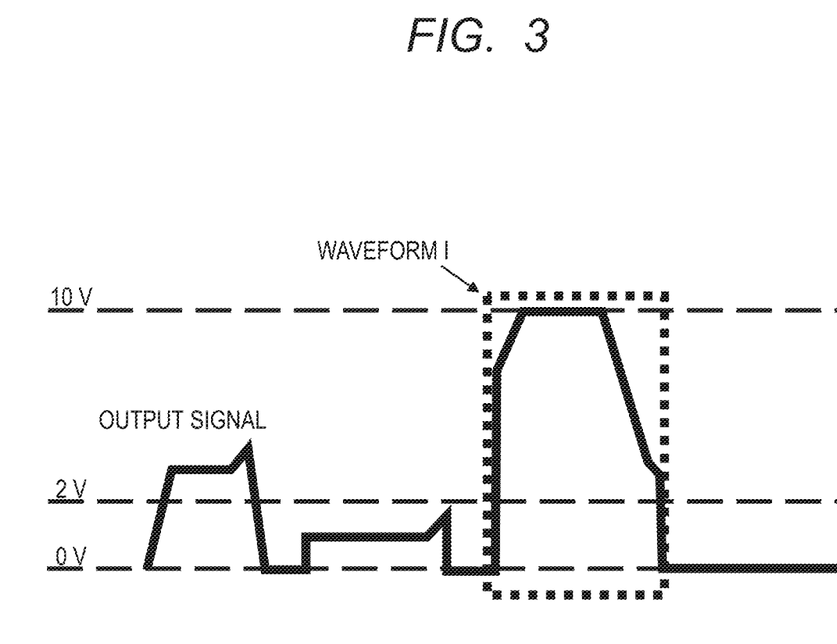
FIG. 3 is a chart for explaining an output signal of the receiving circuit and a target portion of cutting.
Figure 4:
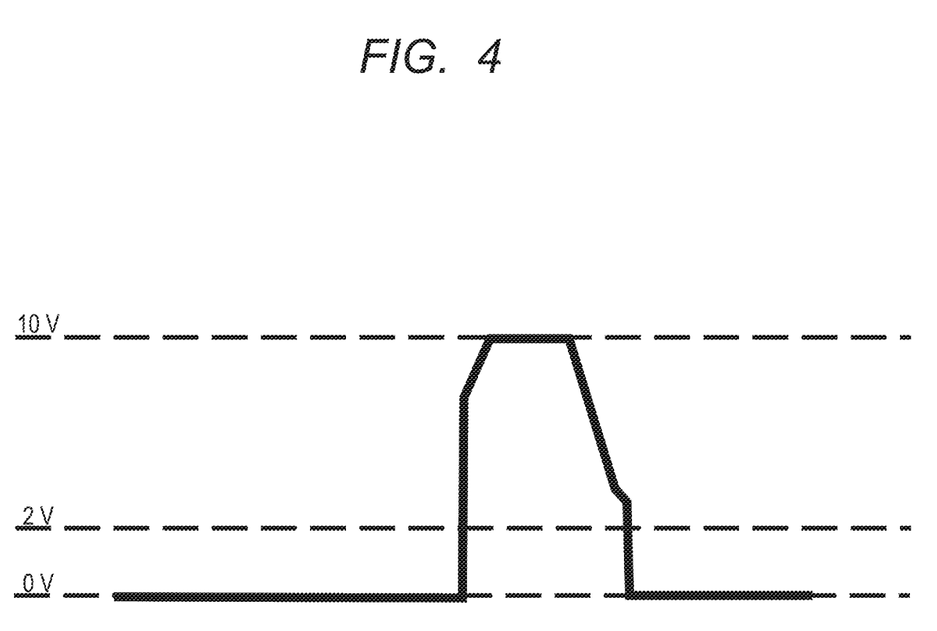
FIG. 4 is a chart showing a waveform of an expected signal for comparison.
Figure 5:
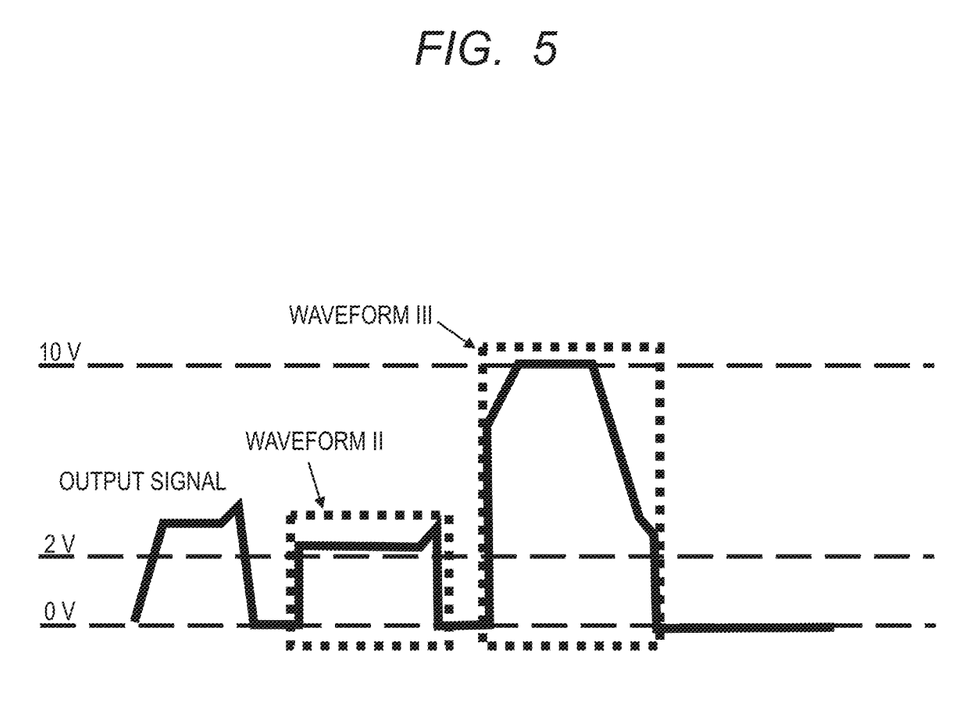
FIG. 5 is a chart for explaining an output signal of the receiving circuit and a portion to be cut.

FIGS. 3 to 5 are charts for explaining an output signal from the receiving circuit 1, an expected signal for comparison, and a part to be cut off when the processing system not using the learning of the neural network model and the processing system shown in FIGS. 1 and 2 are used for waveform cutting.

In order to cut out the waveform I on the basis of the output signal from the receiving circuit 1 shown in FIG. 3, the following algorithm is set in the processing system which does not use the learning of the neural network model.

Algorithms:

(1) Cutting is started when the signal waveform exceeds the 2 V for the second time.

(2) Thereafter, the cutting is terminated when the signal waveform becomes equal or less than 2 V.

In this case, with respect to the output signal from the receiving circuit 1 shown in FIG. 5, since the waveform III of the target portion is not cut but the waveform II is cut by this algorithm, the algorithm must be modified. However, such modification is troublesome.

On the other hand, when the processing system of FIG. 1 or 2 is used for waveform cutting, the waveform III of the target portion can be cut by inputting the expected signal for comparison shown in FIG. 4.

Alternatively, one or both of the input signals of the processed signal validation circuits 3 and 3' shown in FIGS. 1 and 2 may pass through the signal passing circuit 6.

Further, the output of the processing system shown in FIGS. 1 and 2 may pass through the abnormality detection circuit 7.

Figure 6:
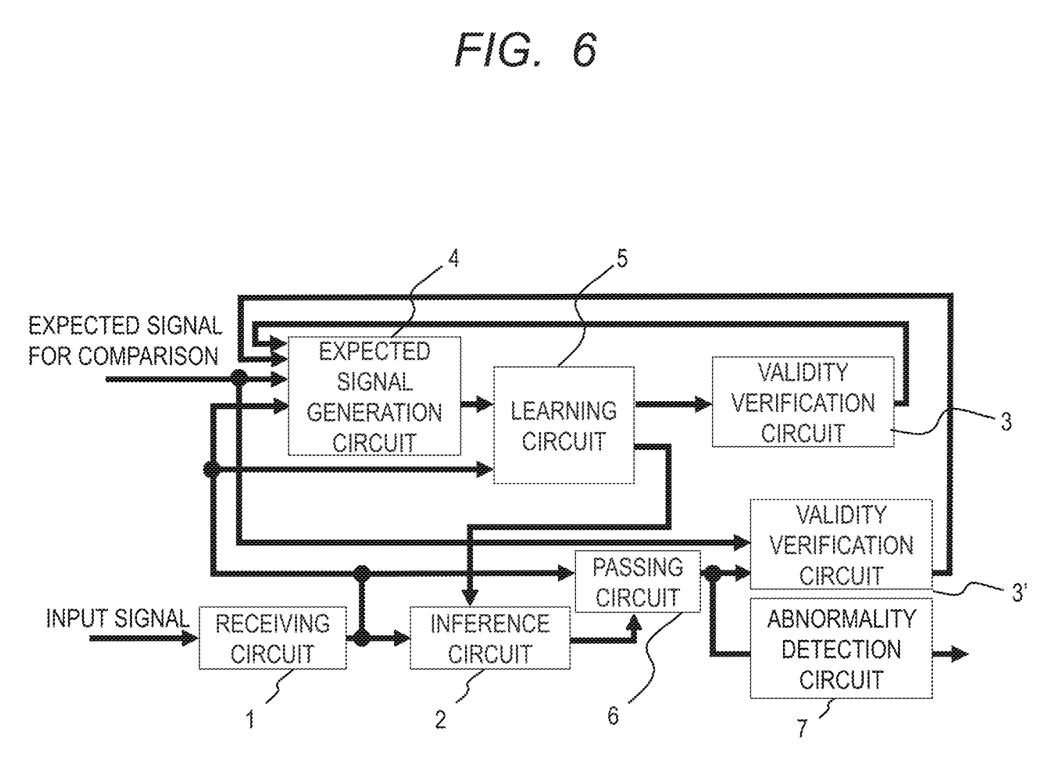
FIG. 6 is a circuit block diagram of an example in which a signal passing circuit and an abnormality detection circuit are applied to the processing system.
Figure 7:
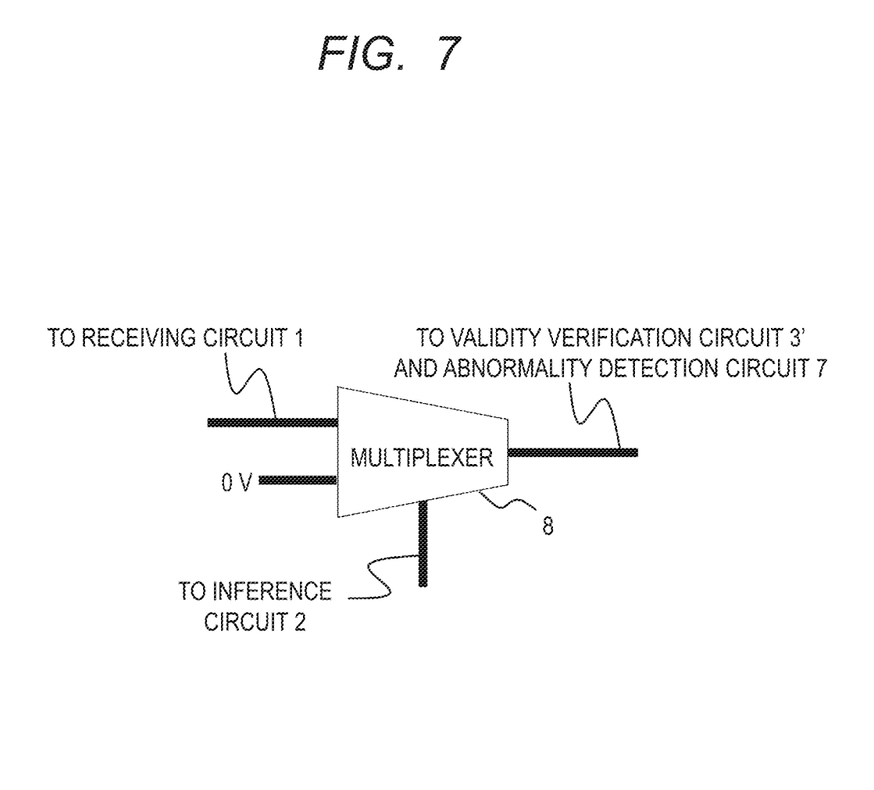
FIG. 7 is a block diagram of a signal passing circuit.

A circuit block diagram in which the signal passing circuit 6 and the abnormality detecting circuit 7 are applied to the processing system of FIG. 1 is shown in FIG. 6, and a block diagram of the signal passing circuit 6 is shown in FIG. 7.

As shown in FIG. 7, the signal passing circuit 6 can be constituted by a multiplexer 8.

Figure 8:
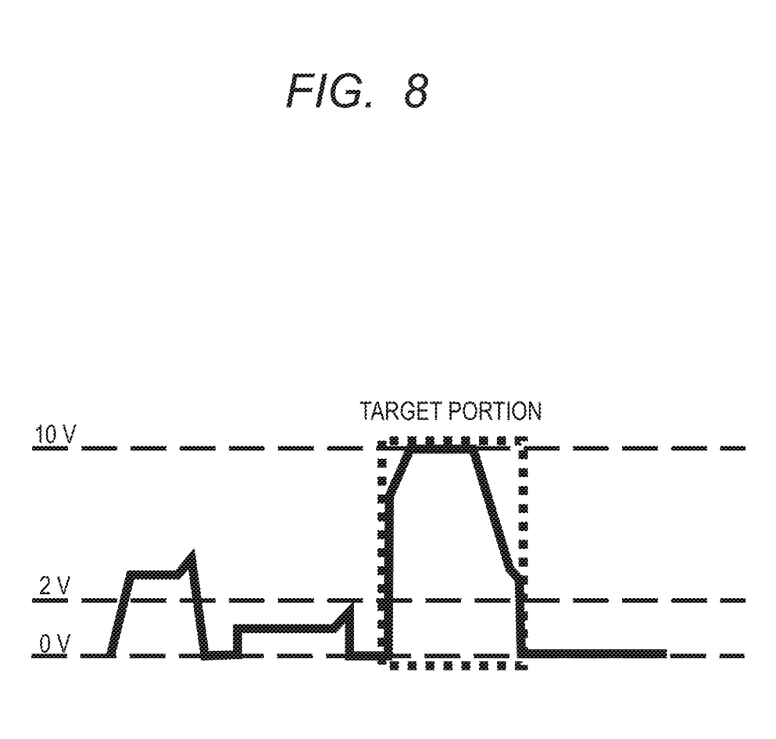
FIG. 8 is a chart showing a waveform of an output signal of the receiving circuit.
Figure 9:
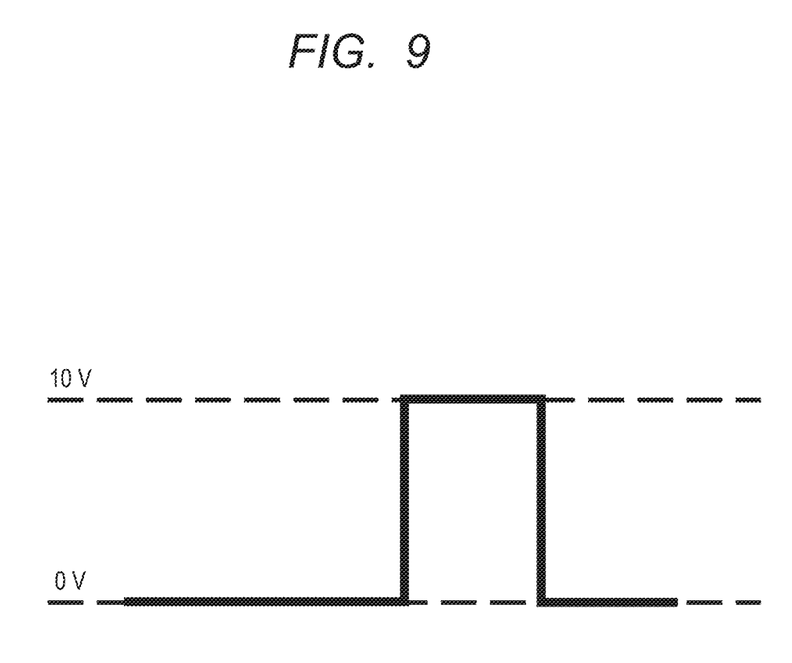
FIG. 9 is a chart illustrating an output signal of the inference circuit.
Figure 10:
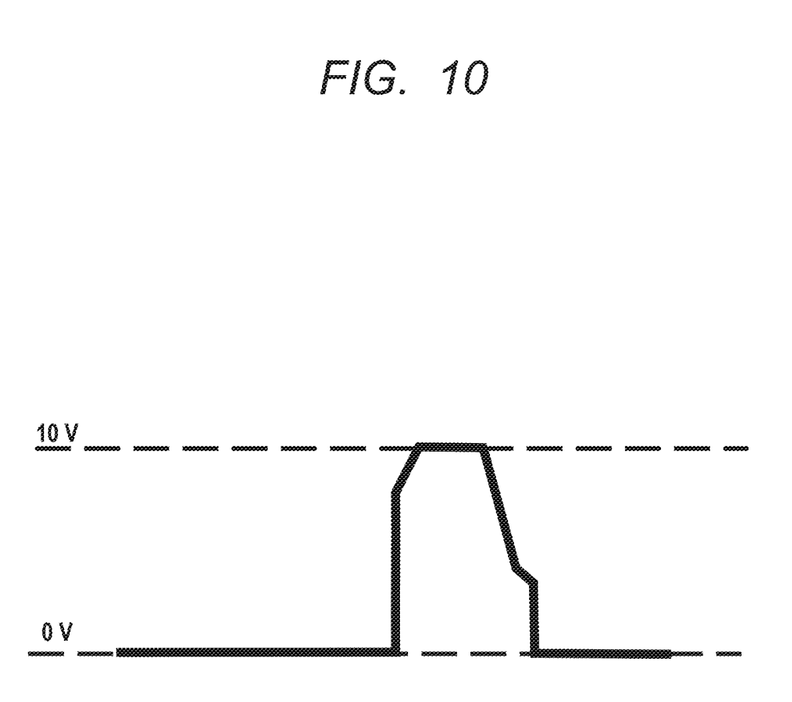
FIG. 10 is a chart illustrating an output signal of the signal passing circuit.

Further, FIGS. 8 to 10 are examples of the output signals of the receiving circuit 1, the inference circuit 2, and the signal passing circuit 6 when the signal passing circuit 6 is applied, respectively. For example, when the output signal from the inference circuit 2 is 10 V, the signal passing circuit 6 passes the signal output from the receiving circuit 1 but passes the 0 V in other cases.

Further, since the signal passing circuit 6 only passes the signal output from the receiving circuit 1, there is an effect that the waveform of the cut-out target portion can be output as the output of the receiving circuit 1, regardless of the signal waveform, as shown in FIG. 10.

Further, by applying the abnormality detection circuit 7, an abnormality of an input signal to the receiving circuit 1 is detected.

Figure 11:
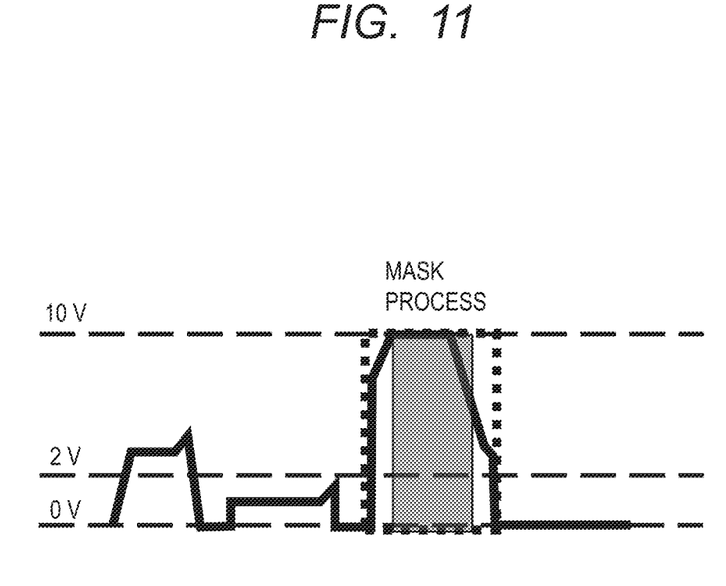
FIG. 11 is a chart for explaining a mask process for a normal signal.
Figure 12:
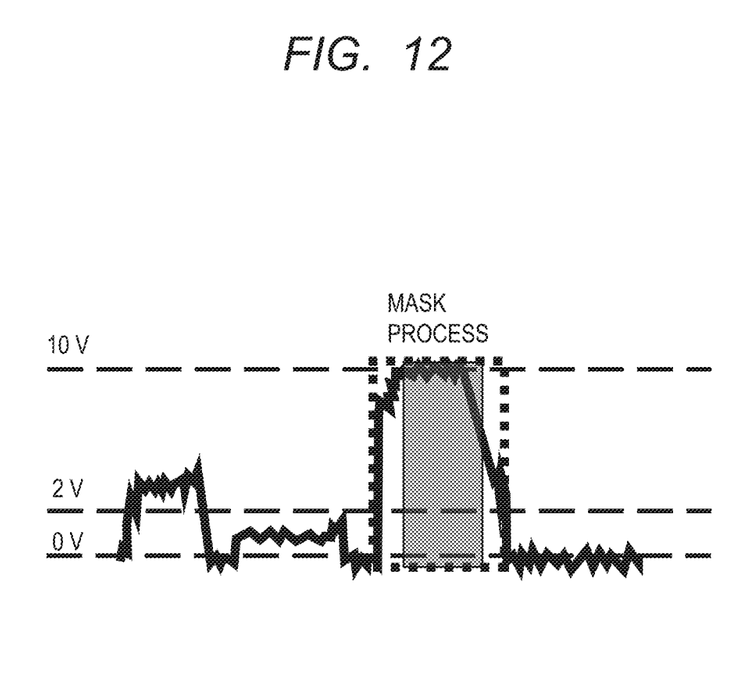
FIG. 12 is a chart for explaining a mask process for an abnormal signal.
Figure 13:
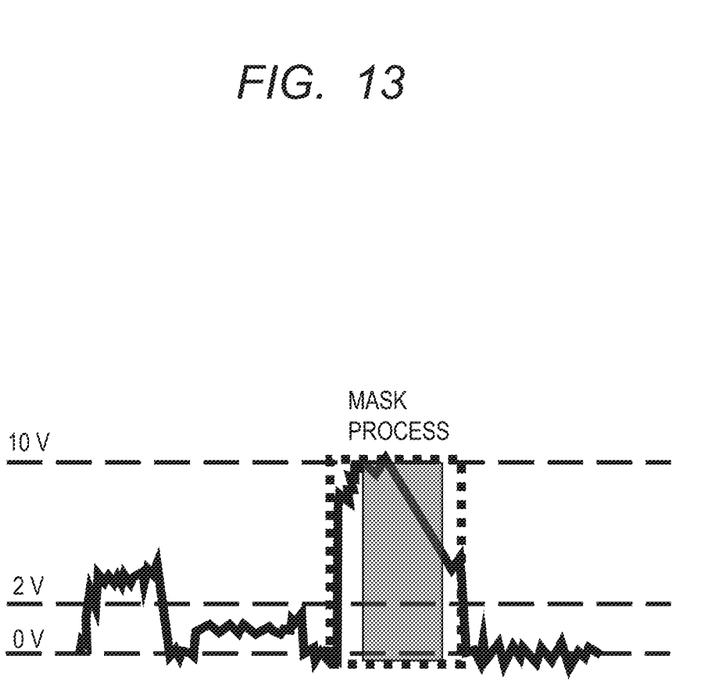
FIG. 13 is a chart for explaining a mask process for an abnormal signal.

FIG. 11 is a chart for explaining a mask process for a normal signal, and FIG. 12 and FIG. 13 are charts for explaining a mask process for an abnormal signal.

When the noise of the output signal of the receiving circuit 1 is large as shown in FIG. 12 or FIG. 13, or when the shape varies, the output signal can be processed by the processing system of FIGS. 1 and 2 by applying a mask in a specific period to avoid the validity check in the validity verification circuits 3 or 3'.

The mask processing method may be specified, for example, to the learning circuit 5 at the same time as the input of the comparison expectation signal.

Although the invention made by the present inventor has been specifically described based on the embodiments, the present invention is not limited to the embodiments described above, and it is needless to say that various modifications can be made without departing from the gist thereof.

For example, the processing system according to the embodiment can be applied to detection of a signal intensity abnormality or a signal duration abnormality instead of a waveform abnormality relating to an input signal of the receiving circuit 1.

The various circuits may be configured by general-purpose circuits using firmware, software, or the like.

What is claimed is:

1. A processing system comprising:
a generation circuit configured to:
   receive an expected signal;
   receive a first input signal;
   generate a first training signal based on the expected signal and the first input signal; and
   output the first training signal;
a machine-learning circuit configured to:
   receive the first training signal from the generation circuit;
   train a neural network model based on the first training signal from the generation circuit to generate a trained neural network model;
   receive the first input signal;
   process the first input signal using the trained neural network model; and
   output a first processed signal and the trained neural network model;
a first comparison circuit configured to:
   receive the first processed signal from the machine-learning circuit;
   compare the first processed signal from the machine-learning model circuit with the expected signal to determine a first degree of similarity between the first processed signal and the expected signal;
   determine that the first degree of similarity between the first processed signal and the expected signal is lower than a threshold degree; and
   transmit a first notification to the generation circuit in response to determining that the first degree of similarity is lower than the threshold degree;
an inference circuit configured to:
   receive the first input signal;
   receive the trained neural network model from the machine-learning circuit;
   infer the first input signal based on the trained neural network model; and
   output an inferred result signal; and
a second comparison circuit configured to:
   receive the inferred result signal from the inference circuit;
   receive the expected signal;
   compare the inferred result signal with the expected signal to determine a second degree of similarity between the inferred result signal and the expected signal;
   determine that the second degree of similarity between the inferred result signal and the expected signal is lower than the threshold degree; and
   transmit a second notification to the generation circuit in response to determining that the second degree of similarity is lower than the threshold degree,
wherein, in response to receiving the first notification from the first comparison circuit and the second notification from the second comparison circuit, the generation circuit generates a second training signal based on the first notification and the second notification, and transmits the second training signal to the machine-learning circuit, and wherein, in response to receiving the second training signal from the generation circuit, the machine-learning circuit trains the trained neural network model based on the second training signal.

2. A method to machine learning with a neural network model, the method comprising:
receiving an expected signal;
receiving a first input signal;
generating a first training signal based on the expected signal and the first input signal;
training the neural network model based on the first training signal to generate a trained neural network model;
processing the first input signal using the trained neural network model to generate a first processed signal;
comparing the first processed signal with the expected signal to determine a first degree of similarity between the first processed signal and the expected signal;
in response to determining that the first degree of similarity is lower than a threshold degree, generating a first notification;
inferring the first input signal based on the trained neural network model to generate an inferred result signal;
comparing the inferred result signal with the expected signal to determine a second degree of similarity between the inferred result signal and the expected signal;
in response to determining that the second degree of similarity is lower than the threshold degree, generating a second notification;
generating, based on the first notification and the second notification, a second training signal; and
training the trained neural network model using the second training signal.

* * * * *